UNITED STATES PATENT OFFICE.

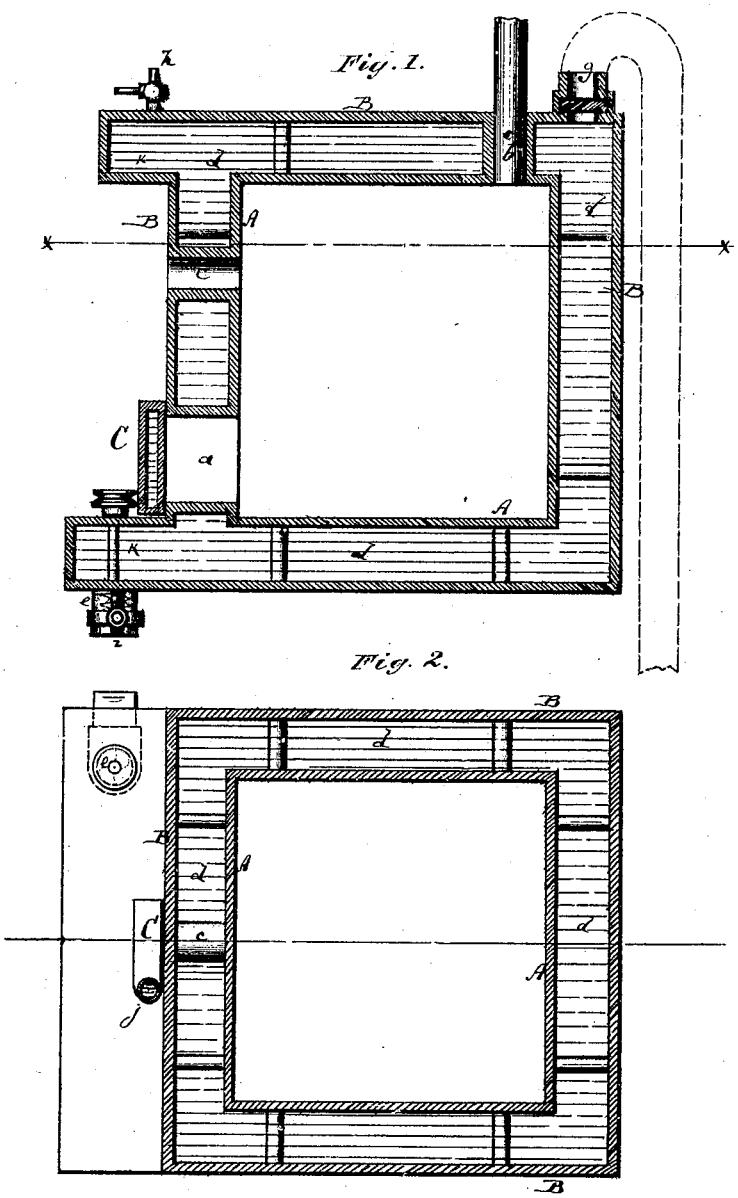

THOMAS RIMMER, OF SOUTH BRAINTREE, MASSACHUSETTS.

IMPROVEMENT IN MARINE STEAM-BOILERS.

Specification forming part of Letters Patent No. 107,293, dated September 13, 1870.

*To all whom it may concern:*

Be it known that I, THOMAS RIMMER, of South Braintree, in the county of Norfolk and State of Massachusetts, have invented a new and Improved Marine Steam-Boiler; and I do hereby declare that the following is a full, clear, and exact description thereof, which will enable others skilled in the art to make and use the same, reference being had to the accompanying drawing, forming part of this specification.

Figure 1 represents a vertical section of my improved steam-boiler. Fig. 2 is a horizontal section of the same, taken on the plane of the line $x\ x$, Fig. 1.

Similar letters of reference indicate corresponding parts.

This invention has for its object to so construct steam-boilers that the same may be surrounded with cold water, which is constantly supplied fresh, for the purpose of preventing the heat from being radiated from the surface of the boiler.

The invention consists, therefore, chiefly in surrounding the entire boiler with a continuous chamber, through which water can be constantly passed.

The invention consists, also, in the arrangement of devices for passing the water into and ejecting it from the said surrounding space.

A in the drawing represents a steam-boiler of suitable form, size, and construction. It is entirely inclosed by an outer case or vessel, B, which leaves an air-tight space, $d$, all around the boiler.

The passages $a$, for inserting the fuel, and $b$, for the escape of the smoke, and $c$, for the escape of the steam, have to be carried through the space $d$ by pipes or channels provided for them, as shown.

The door C of the furnace is made hollow, to receive water and be cool. Water is pumped or forced into the lower part of the space $d$ through a pipe, $e$, which may contain a screw, $f$, for elevating the water, or be connected with a pump or other elevating apparatus. In the upper part of the case B is an opening, $g$, for the discharge of the water.

A boiler set up in a steam-ship will, by the pipe $e$, be provided with a surrounding coating of water, which is continually supplied and flows off through the pipe $g$. The boiler-room will thereby be kept cool, and the attendants preserved from the extreme heat, which, at present, makes their office almost unbearable.

The pipes $e$ and $g$ are provided with suitable slides or valves for regulating the flow of water through them.

$h$ is an aperture in the top of the case B for pouring in water from above, should that be necessary, or to let air escape if the water for filling the space $d$ enters from below. A faucet, $i$, is in the bottom of the case B for drawing off the water when desired.

The pins $j$, on which the door C swings, are tubular, to receive the circulating water from hollow forward-projecting ears $k$ of the case B.

Having thus described my invention, I claim as new and desire to secure by Letters Patent—

1. The water-chamber B, arranged about the boiler to absorb the heat radiated therefrom and keep the boiler-room cool, in the manner described.

2. The combination, with a water-elevating power and a supply-reservoir, of a water-chamber, B, surrounding the boiler, and having inlet $e$ and outlet $g$, arranged as and for the purpose described.

3. The combination, with the water-chamber B, of a door, C, provided with an intermediate chamber filled with a constantly-recurring supply of water, as and for the purpose specified.

THOMAS RIMMER.

Witnesses:
 ANSEL THAYER,
 ELDORA THAYER.